United States Patent [19]

King

[11] 4,398,891
[45] Aug. 16, 1983

[54] BODY RELATED TEACHING KIT

[76] Inventor: Mildred D. King, 100 Temple Dr., Knightdale, N.C. 27545

[21] Appl. No.: 334,558

[22] Filed: Dec. 28, 1981

[51] Int. Cl.³ .............................................. G09B 5/06
[52] U.S. Cl. ................................... 434/159; 434/178; 434/267; 434/308
[58] Field of Search ............... 434/159, 167, 267, 270, 434/271, 272, 274, 308, 172, 178

[56] References Cited

U.S. PATENT DOCUMENTS

| | | | |
|---|---|---|---|
| 3,009,267 | 11/1961 | Bezark | 434/272 |
| 3,593,433 | 7/1971 | Dillon | 434/308 X |
| 3,654,712 | 4/1972 | Bagdasar | 434/172 X |
| 4,288,222 | 9/1981 | Kling | 434/272 |

Primary Examiner—William H. Grieb
Attorney, Agent, or Firm—Mills and Coats

[57] ABSTRACT

The present invention entails a body related teaching kit for teaching children letters of the alphabet, their sounds, and sounds of long and short vowels along with sounds of selected blends. More particularly the body related teaching kit of the present invention includes a sound recording device adapted to play a body alphabet song that relates letters of the alphabet or sounds of various letters to parts of the body. Also forming a part of the body related teaching kit of the present invention is one or more body figures with selected body parts being color coded in relationship to two sets of cards. One set of cards is referred to as poster cards or master cards that includes a particular letter or blend along with a diagrammatic sketch or pictorial representation of the related body part. In addition there is a set of drill cards having both the respective letters or blends thereon along with a representation of the respective body part represented. In the case of the drill cards, the respective letter or letters is separated from the represented body portion in order that either can be shown to the student without revealing the corresponding letter or letters, or the body portion.

4 Claims, 10 Drawing Figures

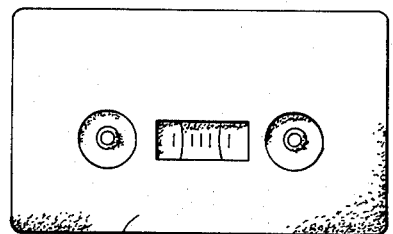
FIG.1A
FIG.1B
FIG.1C
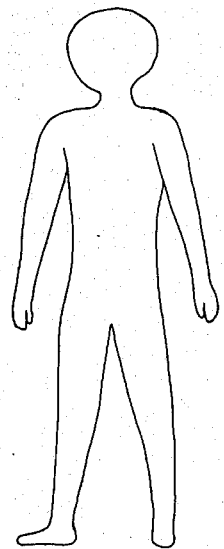
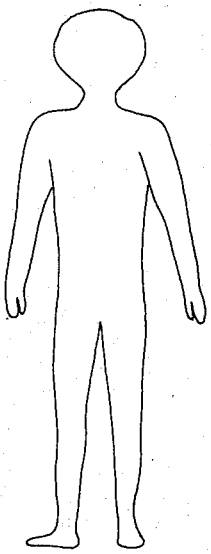
FIG.1D
FIG.1E
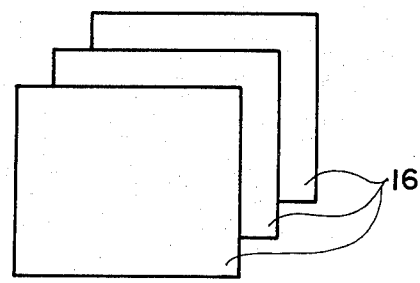
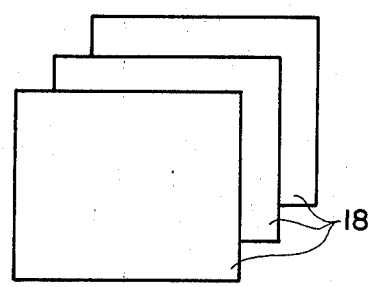
FIG.1

BODY RELATED TEACHING KIT

FIELD OF INVENTION

The present invention relates to teaching aids and kits and more particularly to a teaching aid or kit for teaching children the letters of the alphabet and their sounds through a body related association.

BACKGROUND OF INVENTION

It is well appreciated that learning can be greatly facilitated through relating processes. That is by relating a known to an unknown, one can learn to recognize and appreciate the former unknown through association with the former known.

Teaching the alphabet and the sounds of vowels, letters and blends has always been a very difficult task. This is especially true because the student involved usually is pre-school or an early school age child, generally in the range of five to seven years of age. In addition learning the alphabet and sounds of the various letters involved is not an easy undertaking irrespective of the age of the child involved.

There have been attempts at providing kits and programs for facilitating the teaching of the alphabet and sounds thereof to children. These previous approaches, even in the form of a program or kit, have to a large degree been unsuccessful. But perhaps the most significant drawback has been the inability of such kits or programs to lend themselves for easy understanding and use by other teachers. Expressed in another way, some program approaches for teaching the subject matter being considered can be effectively carried out by a single teacher, usually the originator, but because of the particular design approach and the program's very nature it is often difficult for the same to be utilized in a large scale teaching program by individuals other than the originator.

SUMMARY AND OBJECTS OF INVENTION

The present invention entails a teaching kit for teaching children letters of the alphabet and sounds of vowels, consonants and selected blends. The kit is designed around teaching the letters and sounds by associating such with parts of the human body.

In a preferred kit design, there would be provided a sound recording device that would include one or more songs that relate the various letters of the alphabet and the sounds thereof with body parts. Also provided is one or more body figures with the respective body figures including and showing the body parts referred to by the sound recording device. Next there is provided a series of poster or master cards. Each master card would preferably be color and number coded as could be the body parts referred to above, and would include a letter or blend of letters and a figure representing the body part that that latter or blend of letters stand for. Finally there is provided a group of drill cards with each drill card having a letter or blend of letters forming the subject matter to be taught, along with the representative body portion. But in the case of the drill cards, the letter or letters is separated from the body portion such that either the letter or letters, or the body portion can be disclosed or shown to the student without showing the other. If, therefore, is obvious that these drill cards can be used in carrying out a teaching exercise.

It is, therefore, an object of the present invention to provide a body related teaching kit for teaching children letters of the alphabet and sounds thereof whereby various parts of the body are related to letters and/or sounds.

Another object of the present invention resides in the provision of a teaching kit that teaches children letters of the alphabet and sounds of letters that is effective and efficient, and which lends itself to massive classroom use.

Still a further object of the present invention resides in the provision of a body related teaching kit of the character referred to above that is relatively simple to use and administer, and which will be relatively easy for the classroom teacher to utilize.

Another object of the present invention resides in the provision of a body related teaching kit of the character referred to above that is designed and developed to be easily understood and utilized by the subject students.

It is also an object of the present invention to provide a body related teaching kit for teaching children the alphabet and sounds of the various letters thereof that is simple, easy to use, and which can be expanded to other areas of academic interest.

Still a further object of the present invention resides in providing a body related teaching kit that teaches basic reading skills by relating the particular skill to human body parts and to provide the same with coded features, such as color, number and shape that enable the present system to be a self-teaching one.

Other objects and advantages of the present invention will become apparent from a study of the following description and the accompanying drawings which are merely illustrative of the present invention.

BRIEF DESCRIPTION OF DRAWINGS

FIG. 1 is a diagrammatic illustration of the basic components of the body related teaching kit of the present invention including FIG. 1a showing the sound recording device, FIGS. 1b and 1c showing the two master body figures, and FIGS. 1d and 1e illustrating the poster and drill cards, respectively.

BODY RELATED TEACHING KIT

With further reference to the drawings, there is shown therein a body related teaching kit that is designed and developed to be utilized in teaching basic reading skills.

Viewing this body related teaching kit in more detail, the same is provided with a sound recording device 10 such as a cassette tape or record. This sound recording device would preferably include a body alphabet song wherein the lyrics associate various parts of the human body with certain letters of the alphabet.

While the lyrics could vary, in one body alphabet song, one could expect to find lyrics along the following lines:

"A is for my ankles, ankles, ankles. A is for my ankles, left and right. Twist the left, twist the right.

B is for my backbone, backbone, backbone. B is for my backbone, bend it down. One, down up, Two, down up."

Essentially by playing sound recording 10 to the students, and even allowing them to sing along with the song, the student begins to relate certain letters of the alphabet and their sounds to various parts of the body.

This can be expanded to cover long vowels, short vowels and even blends.

For example, the sound recording device 10 could include a section relating specifically to long vowels, short vowels and even blends. In the case of long vowels, one could expect a series of lyrics along the following lines:

"A is for my aorta, aorta, A is for my aorta, the great artery, Veins take blood to my heart, Aorta artery takes blood from my heart, To and from, to and from.

E is for my esophagus, esophagus, esophagus, E is for my esophagus, passage for my food, From my mouth, to my stomach, From to, from to."

By the same token, the body alphabet song could include a song relating to short vowels. Herein one could expect a song along the following lines:

"A is for my ankles, ankles, ankles A is for my ankles, left and right Twist the left, twist the right.

E is for my ears, oh, My! E in ears is neither short or long. The r controls the E so I will sing."

As noted above, the same type of approach can be utilized for teaching certain blends such as "Th", "Sh", "Ch", "Wh", etc. For example in this regard, one could expect lyrics along the following lines for "Th" and "Sh":

"Th is for my thumbs, thumbs, thumbs, Th is for my thumbs, I have two. One on my left hand, one on my right hand, Move the left, move the right.

Sh is for my shoulders, shoulders, shoulders, Sh is for my shoulders, hold them up, Not down, but up."

Figure 2A:
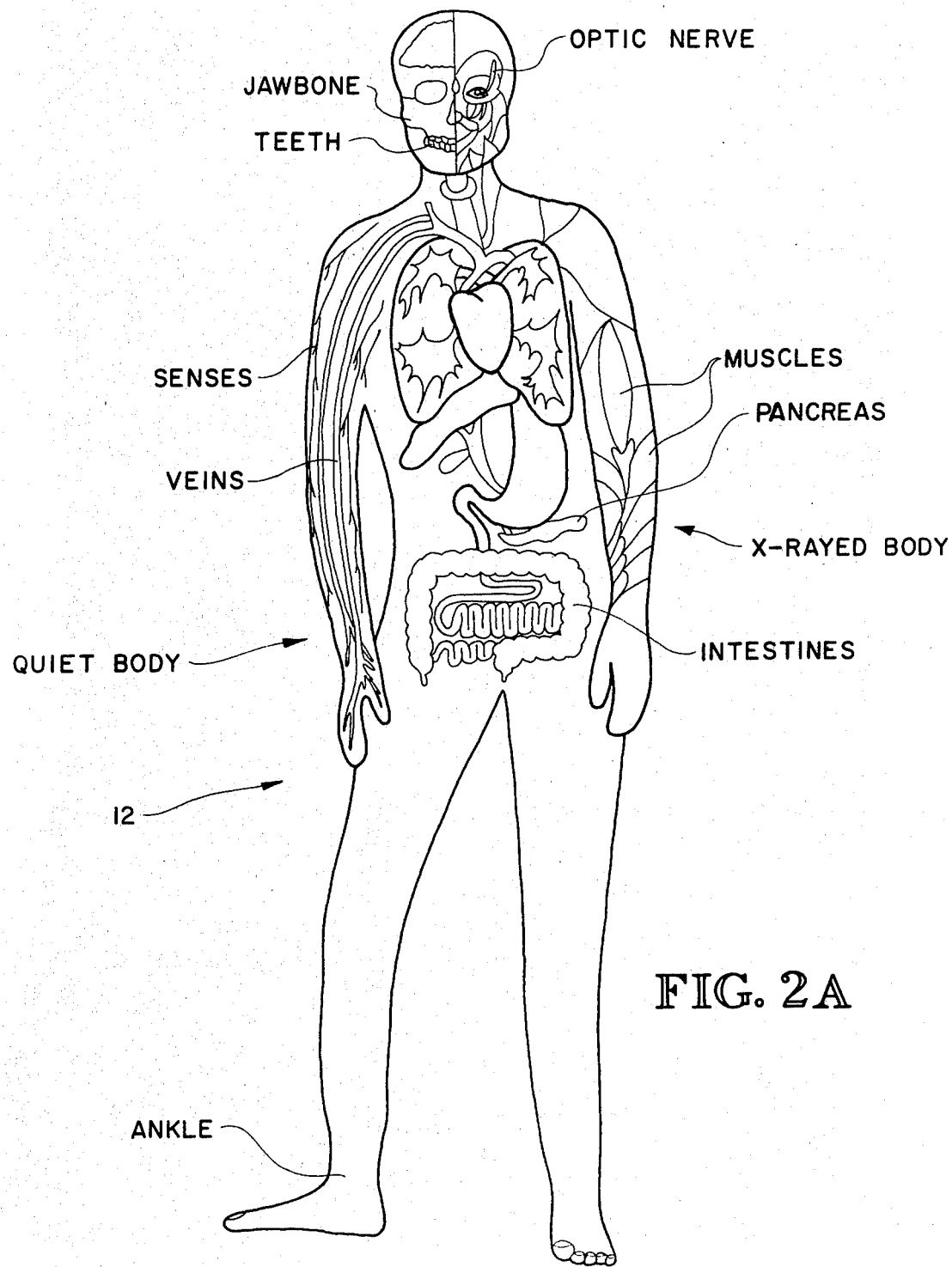
FIG. 2a is a diagrammatic illustration of a first master body figure forming a part of the body related teaching kit of the present invention.
Figure 2B:
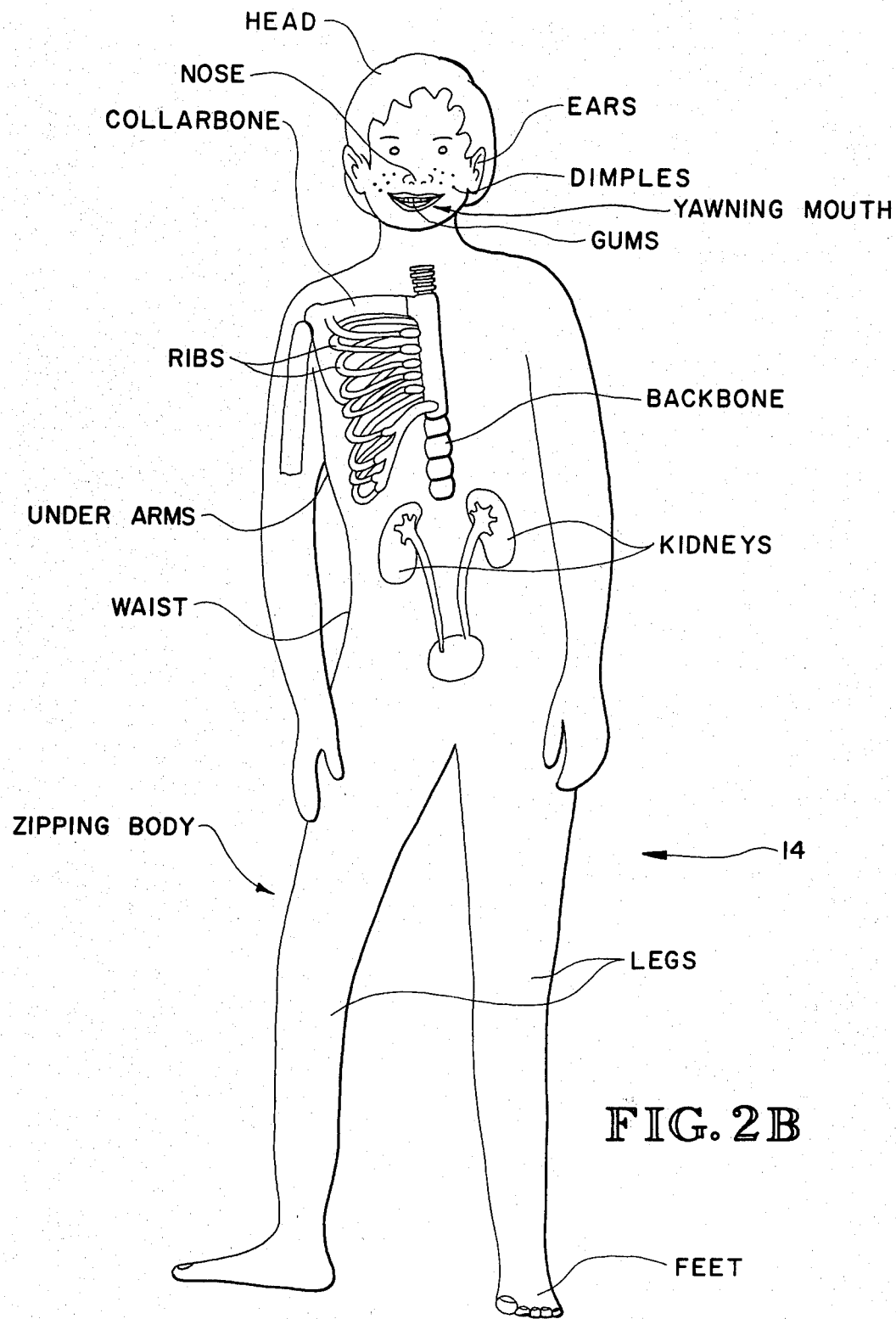
FIG. 2b is a diagrammatic illustration of a second master body figure forming a part of the body related teaching kit of the present invention.

Continuing to refer to the body related teaching kit, the same would include at least one master body figure. In this disclosure, there is shown two master body figures 12 and 14 (FIGS. 2a and 2b) with each body figure including and showing selected body parts that can be either labeled or numbered, or both, and which can be appropriately color coded to correspond with other appropriate components and elements of the body related teaching kit of the present invention.

For example, a review of the two body figures will show that together they include a body word or body portion for each letter of the alphabet. The various parts of the body can be color and number coded.

In the way of an example, the following table illustrates how certain selected body parts can be utilized to teach the letters of the alphabet and sounds thereof:

| NUMBER CODE | KEY BODY WORD | NUMBER CODE | KEY BODY WORD |
| --- | --- | --- | --- |
| 1 | Aa ankle | 14 | Nn nose |
| 2 | Bb backbone | 15 | Oo optic nerve |
| 3 | Cc collarbone | 16 | Pp pancreas |
| 4 | Dd dimples | 17 | Qq quiet body |
| 5 | Ee ears | 18 | Rr ribs |

-continued

| NUMBER CODE | KEY BODY WORD | NUMBER CODE | KEY BODY WORD |
| --- | --- | --- | --- |
| 6 | Ff feet | 19 | Ss senses |
| 7 | Gg gums | 20 | Tt teeth |
| 8 | Hh head | 21 | Uu under arms |
| 9 | Ii intestines | 22 | Vv veins |
| 10 | Jj jawbone | 23 | Ww waist |
| 11 | Kk kidneys | 24 | Xx x-rayed body |
| 12 | Ll legs | 25 | Yy yawning mouth |
| 13 | Mm muscles | 26 | Zz zipping body |

As has already been noted, the same approach can be used to teach long and short vowels and even blends. In the way of an example, the following table shows the number coding and use of body related words to teach long and short vowels and blends:

| LONG VOWELS | |
| --- | --- |
| NUMBER CODE | KEY WORDS |
| 27 | Aorta |
| 28 | Esophagus |
| 29 | Iris |
| 30 | Overall body |
| 31 | Uvula |
| 32 | Bye-bye everybody |

| SHORT VOWELS | |
| --- | --- |
| NUMBER CODE | KEY WORDS |
| 33 | Ankles |
| 34 | Elbows |
| 35 | Intestines |
| 36 | Optic Nerve |
| 37 | Underarms |

| BLENDS | |
| --- | --- |
| NUMBER CODE | KEY WORDS |
| 38 | Thumbs |
| 39 | Shoulders |
| 40 | Cheekbones |
| 41 | Whistling mouth |
| 42 | Stomach |
| 43 | Flatfeet |
| 44 | Small intestines |
| 45 | Scalp |
| 46 | Freckles |
| 47 | Trachea |
| 48 | Plaque |
| 49 | Brain |
| 50 | Skin |
| 51 | Crossed fingers |
| 52 | Quick body |
| 53 | Protein |
| 54 | Growing body |
| 55 | Blood |
| 56 | Spine |
| 57 | Glands |
| 58 | Twenty-four ribs |
| 59 | Sweat glands |
| 60 | Closed eyes |
| 61 | Sleep |
| 62 | Snoring |
| 63 | Dreams |
| 64 | Scratched body |
| 65 | Spleen |
| 66 | Throat |
| 67 | Squatting body |
| 68 | Strong muscles |
| 69 | Spry |

All of the above key body words can be both color and number coded to correspond to respective body parts found in the master body figures 12 and 14. The color coding can be performed in various shapes such as square, rectangular, heart shaped, etc., because of the excessive number of body parts that exceeds easily identifiable colors.

Figure 3:
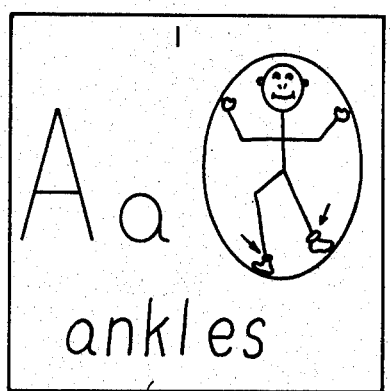
FIG. 3 illustrates a series of poster cards taken from the deck or array of poster cards forming another part of the present invention.
Figure 3:
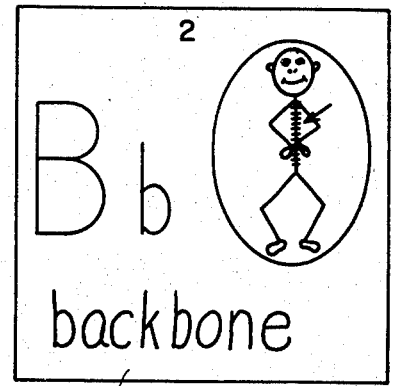
Figure 3:
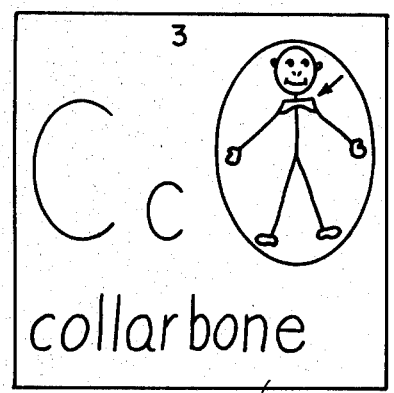
Figure 4:
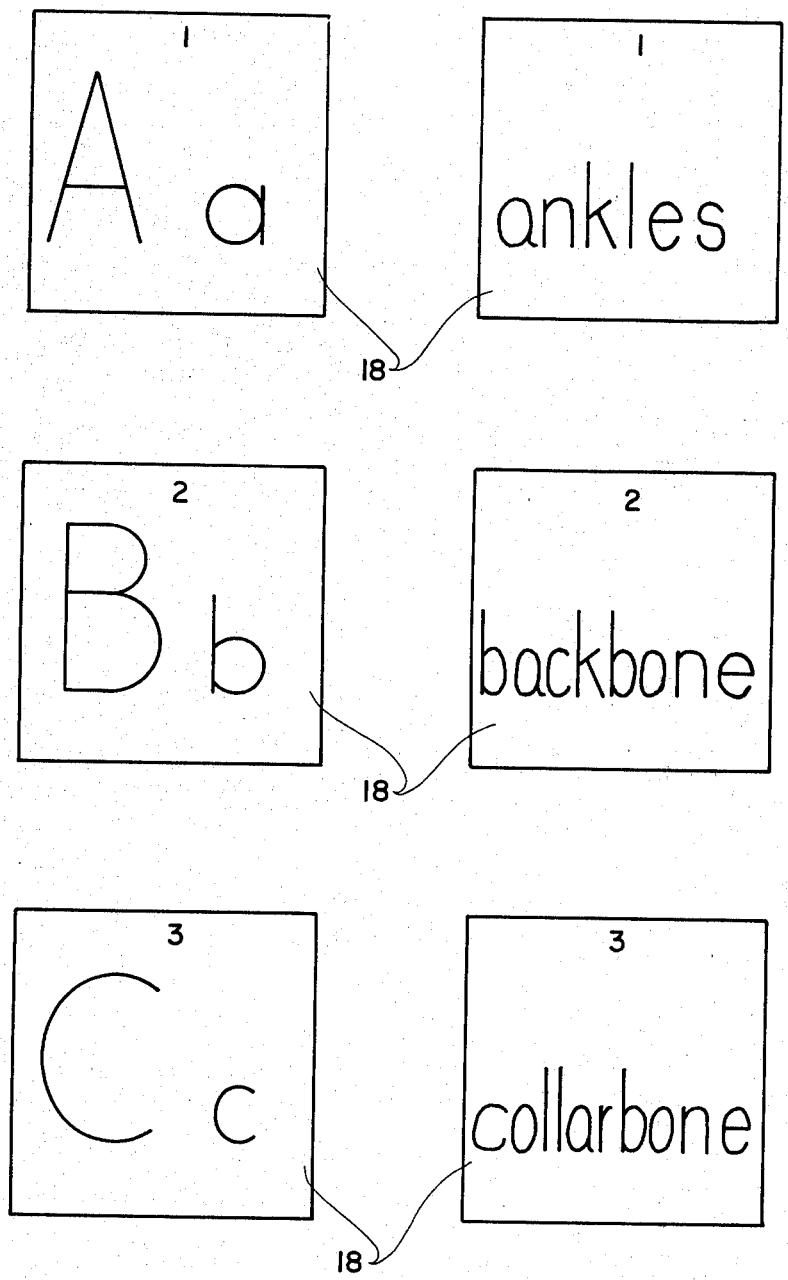
FIG. 4 illustrates a series of drill cards taken from the array or deck of drill cards of the present invention with the respective block illustrations appearing in the left-hand column showing a first side of respective drill cards while the block illustrations appearing in the right-hand column illustrate a second or reverse side of the respective drill cards.

To complete the basic body relating teaching kit, there is provided two sets or decks of cards. One deck of cards, indicated by the numeral 16, is referred to as poster or master cards (FIG. 3). The other set of cards, indicated by the number 18, is referred to as drill cards (FIG. 4).

First, with respect to the poster or master cards 16, they are color and number coded to correspond to the color, number and body words of the kit such as those discussed hereinabove. Viewing the poster or master cards 16, it is seen that the same would again be both color and number coded and would have the key letter or letters thereon and the body part word, along with a body part representation. For example, a series of the poster or master cards 16 are shown in FIG. 3 of the drawings. Card number 1 includes "Aa" adjacent the word "ankle". In addition, adjacent the word "ankle" is a stick figure of an individual with an arrow pointing to the ankle portion of the body. Likewise, the same approach is shown for backbone, collar bone, dimples, etc.

Turning to the drill cards 18, these likewise include the respective subject matter letter or letters along with the key body part word or words. In order to make the drill cards effective, the letters are placed on one side while the key body words are placed on the reverse side. This is illustrated in FIG. 4 of the drawings where for each card one side thereof is shown above while the other side is shown below.

Therefore, in use, the student can learn the relationship between the various letters and sounds involved and the respective body parts through the sound recording device. Next, the poster or master cards can be displayed about the classroom and can be utilized by the student to associate further the letters involved and the respective corresponding body parts.

To drill and carry forth the instructions, the classroom teacher can utilize the drill cards 18. For example, the classroom teacher can show the classroom drill card number 1 having "Aa" thereon. Then the students can respond by repeating the letter and/or corresponding body portion. If a child sees the letter "Bb" on any one of the cards in the body related teaching kit, and does not know the letter nor the sound of the letter, he can see the letter "Bb" written on a certain colored paper and can find the colored alphabet poster or master card and see the picture of a backbone thereon. From the song, "B is for my backbone", he will then recall the name of the letter and its sound.

It should be appreciated that one can extend and reenforce the teaching subject through other schemes and approaches. For example, skills can be developed in the body alphabet that relates to reading, music, art, physical education and math.

From the foregoing specification and discussion, it is appreciated that the body teaching kit of the present invention is particularly designed and developed to be effective and efficient in teaching preschool and first graders letters of the alphabet, short and long vowels, and certain selected blends. Of particular importance is the fact that the present invention is designed and developed such that it can be easily used by classroom teachers without requiring substantial instructions to the teacher.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

I claim:

1. A body related teaching program kit for teaching children letters of the alphabet and the sounds thereof by teaching a student various parts of his or her body and teaching the student to relate various letters of the alphabet and sounds to particular parts of his or her body, said body related teaching program kit comprising: a sound recording device having playable sound rcording means for relating each letter of the alphabet to a particular part of the human body, with each letter of the alphabet representing the initial letter of a particular body part or the initial letter of a word or phrase used in an expression referring to that particular body part; at least one master human figure forming a part of said teaching program kit and having various identifiable body parts forming the same with said identifiable body parts corresponding to letters of the alphabet and respective body parts referenced in said sound recording means; an array of master cards with each master card including a respective letter of the alphabet and a pictorial representation of the body portion for which that respective letter stands for or relates to as set forth in said playable sound recording means and referenced on said master human figure; an array of drill cards with each drill card having a respective letter of the alphabet thereon that stands for or relates to a body part as set forth in said playable sound recording means and as referenced on said master human figure; and wherein there is provided a body related word representation on each of either said master cards or drill cards with said body related word representation representing a body part that is representative of an associated letter of the alphabet provided on the same card.

2. A body related teaching program kit of claim 1 including two master human figures with each human figure having selected and identified body portions exposed from which students can study and learn, and wherein said selected and identified body parts correspond to body parts referenced in said sound recording.

3. The body related teaching program kit of claim 1 wherein said array of master cards and said array of said drill cards each include at least twenty-six separate and distinct cards with each card having at least one letter of the alphabet provided thereon.

4. The body related teaching program of claim 3 wherein there is provided additional means for coordinating respective master cards with respective drill cards, and said coordinating means is provided by color and number coding on both said master and drill cards.

* * * * *